United States Patent [19]

Shchipachev

[11] Patent Number: 5,549,721
[45] Date of Patent: Aug. 27, 1996

[54] CELL FOR GAS CLEANING

[76] Inventor: Viktor Shchipachev, 24 High St. #122, Springfield, Mass. 01105

[21] Appl. No.: 348,481
[22] Filed: Dec. 2, 1994
[51] Int. Cl.$^6$ .................................................. B01D 45/04
[52] U.S. Cl. ........................ 55/393; 55/394; 55/396
[58] Field of Search .......................... 55/277, 278, 307, 55/342, 347, 348, 392–394, 396, 448

[56] References Cited

U.S. PATENT DOCUMENTS

| | | | |
|---|---|---|---|
| 2,193,883 | 3/1940 | Reeves | 55/396 X |
| 2,372,316 | 3/1945 | Curtis | 55/342 |
| 2,662,610 | 12/1953 | Heinrich | 55/347 |
| 2,712,859 | 7/1955 | Wintermute | 55/393 |
| 2,806,551 | 9/1957 | Heinrich | 55/347 X |
| 3,279,155 | 10/1966 | Lambert | 55/307 X |
| 3,884,660 | 5/1975 | Perry, Jr. et al. | 55/396 |
| 3,885,934 | 5/1975 | Eads et al. | 55/392 X |
| 3,954,428 | 5/1976 | Marple et al. | 55/307 X |
| 4,093,427 | 6/1978 | Schlenker | 55/342 X |
| 4,537,608 | 8/1985 | Koslow | 55/347 X |

FOREIGN PATENT DOCUMENTS

| | | | |
|---|---|---|---|
| 0555435 | 4/1958 | Canada | 55/342 |
| 0066829 | 5/1948 | Denmark | 55/348 |
| 0627865 | 8/1978 | U.S.S.R. | 55/277 |
| 0752353 | 7/1956 | United Kingdom | 55/277 |

*Primary Examiner*—Robert Spitzer

[57] ABSTRACT

A cell for gas cleaning, preferably for separating gases from solid particles, includes an inlet pipe connected gas-tightly to a casing, and an entrapment pipe mounted within casing downstream of the inlet pipe. An enter opening of the entrapment pipe faces an outlet of the inlet pipe. A free area of the enter opening of the entrapment pipe is larger than a free area of the outlet of the inlet pipe, and smaller than a free area of the passageway of the casing. The cylindrical settling portion of the inlet pipe allows to establish a stationary condition of the dust laden gas flow. Separation is achieved by extension of the stationary dust laden gas flow when it enters the casing through the outlet of the inlet pipe. The stream of the particles does not expand, and almost all the number of the particles travels due to particle inertia toward the enter opening of the entrapment pipe. The detained portion of the entrapment pipe prevents the entrapped particles to escape from the entrapment pipe to the cleaned gas which is flowing the casing. Being passed the detaining portion of the entrapment pipe, separated particles are carried away by a small percentage of the incoming gas, through the discharge end of the entrapment pipe to the associated hopper. The main portion of the cleaned gas exits from the cell to its next destination.

24 Claims, 2 Drawing Sheets

CELL FOR GAS CLEANING

FIELD OF THE INVENTION

This invention pertains to inertial devices for separating and cleaning gases from solid particles such as grit and dust, and also may be used for removing mist droplets from gases.

BACKGROUND OF THE INVENTION

Known in the art are various inertial devices for separating gases from solid particles such as: cyclones which make use of centrifugal effect arising from rotation of the dust laden gas flow; particular separators, in which separation is achieved by bending the dust laden gas flow so that the particle inertia carries the particles into the capture area (see, for example, J. P. Murphy, U.S. Pat. No. 3,970,439); louvered collectors, in which the dust laden gas flow changes the direction, and the particles impinge on the deflection surfaces and concentrate in a predetermined downstream area (see, for example, J. Bakharev, U.S. Pat. No. 5,221,305); particulate separator, which incorporates means such as venturi for directing the particles into a predominated location in the flow, and the screens-filters located downstream of the director for entrapment of the particles (D. Endicott, U.S. Pat. No. 3,872,012).

All the inertial devices heretofore known suffer from a number of disadvantages, for example:

(a) Their cleaning efficiency is often not high enough to meet air pollution control requirements. To obtain the desired degree of air purification two or three devices have to be connected in series, which increases both the equipment costs and the energy expenditure (the latter is directly due to the increase in a pressure drop experienced by the gas flow as it progresses through the device).

(b) Separating gases from dust is accompanied with the interaction between solid particles and the walls of the device and/or other surfaces. For example, in cyclones the gas flow is rotating such that the particle inertia presses and chafes particles against the wall. In the louvered collectors the incoming particles impinge on the particle-deflecting elements, such as conical rings, which leads to considerable ring wear over a period of time, thus necessitating frequent ring replacement and device downtime.

(c) The interaction mentioned above has resulted not only in the concentration of the particles in the predetermined area due to directing of their ordered motion, but also in the increase in the random motion of the particles, which causes the particles to tend to escape from the predetermined area to the cleaned gas flow. As a result, the cleaning efficiency does not uniformly increase up with increases in the gas flow velocity through the device, as it is suggested in theory, but passes a maximum (which depends on the type of device being used), then drops, sometimes abruptly. For this reason, the devices known heretofore work at relatively low gas flow velocities which are 30 m/s at most. The higher velocities are generally desirable, since the throughput capacity of the device is directly proportional to the velocity.

(d) The conical louvered collectors with the high cleaning efficiency known heretofore require precise workmanship, and thus involves significant cost increase. For example, the device according to the Bakharev patent which is claimed to produce the cleaning efficiency of up to the 95% requires a plurality of rings which are finished to size by turning accuracy of up to 0.1 mm.

(e) Because of the presence of the screens-filters in the particulate separator (see the Endicott patent), the pressure drop through the device increases. In addition, the filters of fine mesh require recurrent refinements. As a result, the maintenance charges increase. The particulate separator being used for the dust laden gas cleaning does not produce high enough cleaning efficiencies. Although it is not specified in the patent and the cleaning efficiency is not mentioned, the solid particles inevitably impinge on screens-filters and change the direction, thus mixing with the cleaned gas.

BRIEF DESCRIPTION OF THE INVENTION

The main object of the present invention is to provide a device for gas cleaning, preferably for separating gases from solid particles, which has considerably higher cleaning efficiency than the known inertial devices.

It is another important object of the invention to provide such a device which has considerably lesser surface wear, thus prolonged service life, than the known inertial devices.

Other important objects of the invention are:

to provide a device with a considerably higher throughput capacity than the known inertial devices, because it will operate at the very high velocities of the gas flow through the device, which could reach the speed of sound;

to provide a device which is much cheaper than known inertial devices, because it could be manufactured by stamping from metal sheet (without requiring to use precise turning); and to provide a device having no considerable maintenance charges due to recurrent refinements.

These and other objects of the present invention are accomplished in the cell for gas cleaning, which separates solid particles from dust laden gas flow. The cell includes an inlet pipe which is connected to a casing, and an entrapment pipe which is mounted within the casing downstream of the inlet pipe. The enter opening of the entrapment pipe faces the outlet of the inlet pipe. The inlet pipe, the casing, and the entrapment pipe are coaxially aligned.

For separation operation, the dust laden gas flow is accelerated in the inlet pipe, then the gas flow travels the cylindrical settling portion of the inlet pipe, in which a stationary condition of the flow is established. Entering the casing through the outlet of the inlet pipe, gas expands and fills up the entire passageway of the casing. A free area of the passageway is at least twice as large as a free area of the outlet of the inlet pipe. In contradistinction to the gas flow, the concentrated stream of particles does not expand, but proceeds due to particle inertia toward the enter opening of the entrapment pipe. A free area of the enter opening of the entrapment pipe is larger than a free area of the outlet of the inlet pipe, and smaller than a free area of the passageway of the casing, which causes almost all the number of the particles to be entrapped into the entrapment pipe. The distance between the inlet pipe and the entrapment pipe is optimized so that the particles could not be carried away by the expanding gas. The detaining portion of the entrapment pipe does not allow entrapped particles to escape into the casing and mix with the cleaned gas. After having passed through the discharged end of the entrapment pipe, the separated particles leave the cell and are directed into a suitable hopper or collecting chamber. The casing, apart from supporting the inlet pipe and the entrapment pipe, serves to deliver the cleaned gas to its next destination.

The invention may be used for cleaning technological and household gases, for instance, from metallurgical, chemical, thermal utility, construction industry, power stations, and other plants, for electronics and precise instrumentation industries, etc. It can be also used to separate and collect valuable materials dispersed as particulate matter in a body of air or gas, e.g., to separate and collect coal dust in the coal-milling process, or metal powder produced in a metallurgy, etc. The cell can be also effectively used for separation of the mist droplets from gases.

The advantages of the cell according to the present invention will become apparent from a consideration of the ensuing description and the drawings.

REFERENCE NUMERALS IN DRAWINGS

Figure 1:
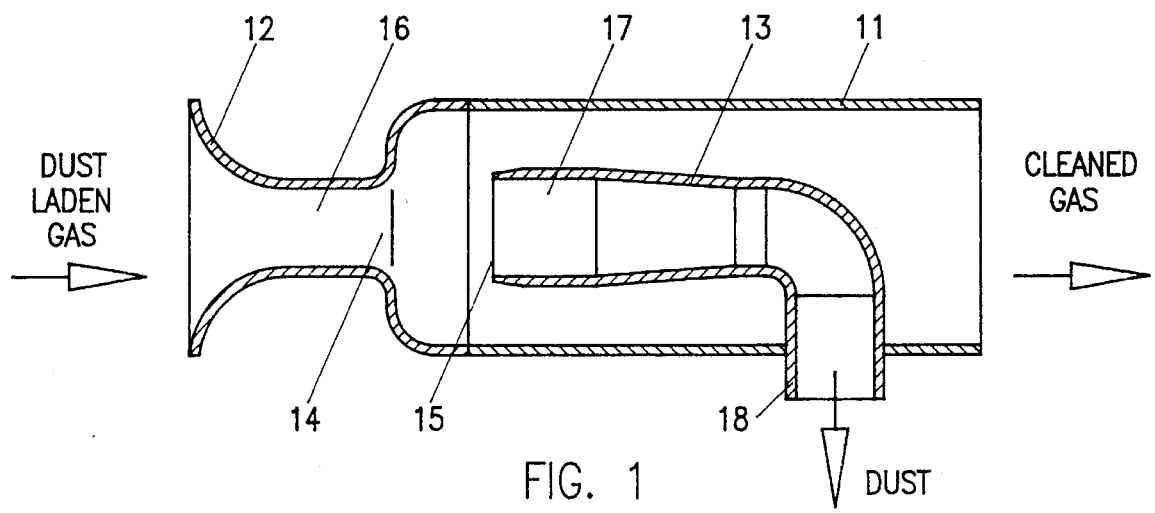
FIG. 1 is a cross-sectional view of a cell for gas cleaning constructed according to one embodiment of the present invention, a cross-section being taken along the axis of the cell.

In the drawings, closely related details have the same reference number but different primed symbols.
11 casing
12 inlet pipe
13 entrapment pipe
14 outlet of the inlet pipe
15 enter opening of the entrapment pipe
16 settling portion of the inlet pipe
17 detaining portion of the entrapment pipe
18 discharge end of the entrapment pipe
19 sliding fitting
20 center-body
21 legs of the center-body
22 vent pipe
23 legs of the vent pipe
24 gas duct
25 first partition sheet
26 second partition sheet
27 volume between two partition sheets
28 cells for gas cleaning
29 conduit

DETAIL DESCRIPTION OF THE INVENTION

A typical cell for gas cleaning constructed according to the present invention is illustrated in FIG 1. The cell includes a casing 11, an inlet pipe 12, which may be formed independently and welded or brazed to the casing 11, or may be formed as an integral part of the casing 11, and a particle entrapment pipe 13 which is mounted within the casing 11, and located downstream of the inlet pipe 12. The inlet pipe 12, the casing 11, and the particle entrapment pipe 13 are coaxially aligned. The enter opening 15 of the entrapment pipe 13 faces the outlet 14 of the inlet pipe 12. A free area of the passageway of the casing 11 is at least twice as large as a free area of the outlet 14 of the inlet pipe. A free area of the enter opening 15 of the entrapment pipe 13 is larger than a free area of the outlet 14, and smaller than a free area of the passageway of the casing 11. The inlet pipe 12 has a settling portion 16 which is cylindrical in shape. The entrapment pipe has a detaining portion 17 which is of cylindrical or slightly narrowed shape, so that a line tangent to the wall of the detaining portion 17 makes an angle 15° at most to the vector of the average velocity of the entrapped particles. The discharge end 18 of the entrapment pipe 13 passes through the wall of the casing 11, and is secured gas-tightly to the casing 11.

Figure 2:
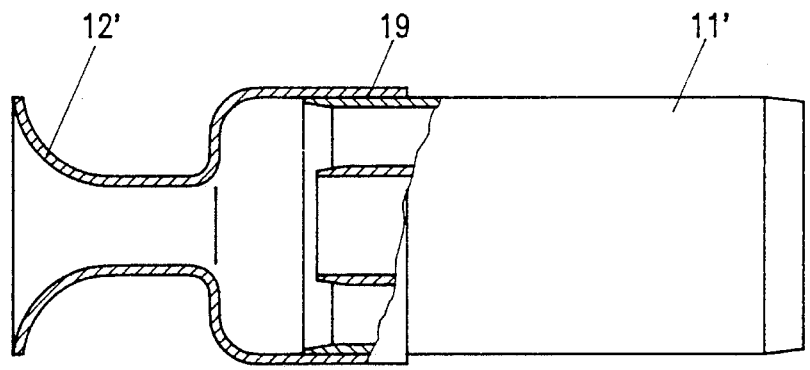
FIG. 2 is a view of the cell of FIG. 1 with modified connection of the inlet pipe to the casing, partly in a cross-section taken along the axis of the cell.

There is a minimum standoff distance of the enter opening 15 from the outlet 14, which may vary within "A" and "8A", here "A" depends on the configuration of the outlet 14. In a general case, "A" is a quotient obtained when a free area of the outlet 14 is divided by the perimeter of the outlet 14. In the cell in FIG. 1 which is designed with the round-shaped inlet pipe 12 according to the first embodiment of the present invention, "A" equals one half of the radius of the outlet 14. Optimization of the standoff distance is required to meet various parameters of the industrial process, on which the cell will be used. This is provided by using the variant of the cell shown in FIG.2, in which the replacement of the inlet pipe 12' with respect to the casing 11' is provided experimentally by using a sliding fitting 19. At the distances which are smaller than the optimized distance, the increase in a pressure drop through the cell occurs. At the distances which are larger than the optimized distance, no efficient separation would take place. For effective operation of the device, the settling portion of the inlet pipe is of length which is larger than "A", and the detaining portion of the particle entrapment pipe is larger than 2"A".

Figure 3:
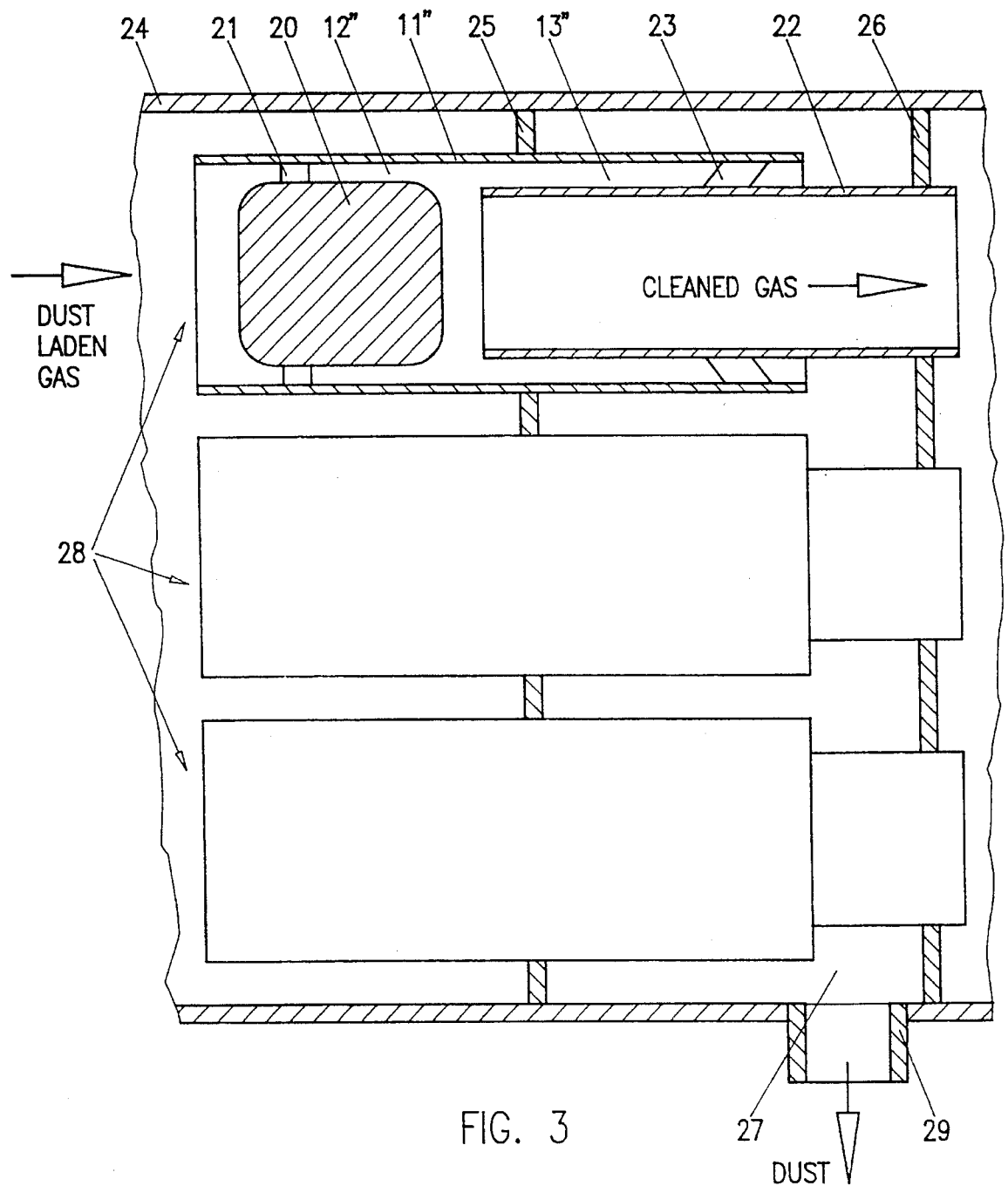
FIG. 3 is a schematic illustration of the gas cleaning device composed as a plurality of the ring-shaped cells according to a second embodiment of the present invention.

The cell according to a second embodiment of the present invention is shown in FIG. 3. Several cells are connected in a modular fashion in parallel to enhance throughput capacity. The cells are designated generally by the reference numeral 28. The cell 28 has an inlet pipe 12" in a form of a ring which is defined by the interior wall of the casing 11" and the center-body 20 which is secured to the casing 11" by legs 21. The entrapment pipe 13" is also of a ring form which is defined by the interior wall of the casing 11" and the exterior wall of a vent pipe 22, and is secured to the casing 11" by legs 23. The cells 28 are secured by a known matter between two partition sheets 25 and 26, which portion a main gas duct 24, and form the volume 27 therebetween. The separated particles leave the volume 27 through a suitable conduit 29 and are directed into the hopper or collecting chamber (not shown). The cleaned gas may flow via a vent pipe 22 downstream of the sheet 26 and exit from the device in any suitable manner. Since each cell is a complete particulate separator in itself, cells may be added or deleted to meet the required throughput capacity without any effect on the cleaning efficiency. The cells according to a first embodiment of this invention (see FIG. 1) may also be connected in a modular fashion in parallel in the way similar to that described above. In this case the discharge ends 18 of all entrapment pipes 13 are in communication with the volume 27.

The cell in FIG. 1 functions in the following manner. The dust laden gas flow enters the cell from a main duct or pipeline because of the pressure differential between the outer space and the space inside the cell. The gas flow is accelerated, then travels the settling portion 16 of the inlet pipe 12. Along the length of the settling portion 16 the stationary condition of the gas flow will be established. In the stationary dust laden gas flow the velocity of the ordered motion of solid particles is the same as the velocity of the ordered motion of gas molecules. However, the velocity of the random motion of gas molecules is ten times more than the velocity of their ordered motion. At the same time, the velocity of the random motion of solid particles is hundreds times less than the velocity of their ordered motion. As a result, under a stationary condition of the dust laden gas flow the velocity of the random motion of solid particles is thousands times less than that of gas molecules.

Entering the casing 11 through the outlet 14, the gas flow expands due to the high velocity of the random motion of molecules, and fills up the entire passageway of the casing 11. However, the concentrated stream of solid particles does not expand, because the velocity of the random motion of particles is close to zero, so the stream proceeds due to particle inertia toward the enter opening 15 of the entrapment pipe 13, being accompanied by a small portion of the incoming gas. The configuration of the stream of particles remains almost the same as the configuration of a free area of the outlet 14. Since the enter opening 15 faces the outlet 14, and has a free area which is larger than a free area of the outlet 14, the entrapment pipe 13 entraps almost all number of the separated particles. This ensures the high level of the cleaning efficiency.

The particles cannot escape from the detaining portion 17 of the entrapment pipe 13 because along the length "2A" they could impinge on the wall at an angle which does not exceed 15°, so there is no way of introducing the required momentum to the particles in a reverse direction. For the same reason the detaining portion 17 does not suffer from the surface wear, hence, no significant effect on the cleaning efficiency will take place which is caused by the distortion of the true shape of the entrapment pipe.

A small percentage of the gas flow passing through the cell which will be lost to the entrapment pipe 13 is sufficient to carry the entrapped particles through the discharge end 18 of the entrapment pipe 13 to the associated hopper (not shown in FIGS). The particles are removed from the hopper by any suitable matter.

Thus, there has been shown and described a novel cell for gas cleaning which fulfill all the objects sought therefor. It should be understood that a highly significant advantage of the present invention is that the cell produces a cleaning efficiency which reaches 99.4%. Tests have been made up for the separation air from the fly ash with the particle size from about 1 μm to 30 μm. It may be noted that the cleaning efficiency of the best inertial device according to the Bakharev patent is claimed only 95%, with the same kind of fly ash used for testing. It is obvious that air which is cleaned by the cell according to the present invention contains solid particles 8.3 times less as compared to the air which have been cleaned by the device according to the Bakharev patent would. Such a significant improvement of the cleaning efficiency is an unexpected new result of the present invention.

In addition, it should be contemplated that the cell for gas cleaning according to this invention will have a prolonged service life, because the considerable surface wear occurs only beyond the detaining portion of the entrapment pipe, which does not effect the cleaning efficiency. Since the separation of the solid particles from the gases achieved by the expansion of the gas due to the high velocity of the random motion of molecules, there is no interaction between particles and interior surfaces of the device. Thus, there is no way of increasing random motion of particles, which remains negligibly low (close to zero). This condition does not change under varying the velocity of the dust laden gas flow through the cell. Therefore, it will be understood that the cell provides a high degree of separation at the highest velocities of the dust laden gas flow which can reach the speed of sound.

Because of the simplicity in design of the structural parts of the cell according to any of two embodiments of the present invention described above, it is seen that there is no need for precise turning to be used for the manufacture of the cell. The means for entrapment of the separated particles do not include any screens and/or filters similar to those that are claimed in the Endicott patent. Thus, it is seen that a stable nearly maintenance-free operation of the cell is ensured.

It may be also noted that it is corroborated experimentally that the cell for gas cleaning according to the present invention also provides for the separation of the mist droplets from air.

The invention and its advantages will be still more fully comprehended from the following example of practical implementation on a test scale.

EXAMPLE

The cell constructed as shown in FIG. 1 had a casing diameter of 61 mm, the diameter of the outlet of the inlet pipe was 20 mm, and the diameter of the enter opening of the entrapment pipe was 30 mm. The distance between the outlet of the inlet pipe and the enter opening of the entrapment pipe was 24 mm. The fly ash concentration in air was 10 g/m$^3$, air flow rate through the cell, was allowed 1.1 m$^3$/min, air flow rate through the entrapment pipe was allowed 0.03 m$^3$/min. The fly ash had the following fractional composition: the particles in the size range from 30 μm to 20 μm accounted 50% of the total, the particles in the size range from 20 μm to 10 μm accounted 45% of the total the particles in the size range from 10 μm to 1 μm accounted 5% of the total. The mean statistical gravimetric cleaning efficiency based on the results of ten check measurements was 99.4%, with an estimate cumulate error from all sources of +0.1%.

What is claimed is:

1. A cell for cleaning particulates from a gas flow, comprising:

an inlet pipe connected gas-tightly to a casing, the casing forming a passageway, a first free area of an outlet of said inlet pipe being smaller than a second free area of the passageway, and an entrapment pipe mounted with said casing and downstream of said inlet pipe, said entrapment pipe having an opening facing said outlet, a third free area of said opening being larger than said first free area, and being smaller than said second free area of said passageway, said entrapment pipe having a discharge end and being secured rigidly to said casing; said inlet pipe, said casing, and said opening being coaxially aligned and constructed and arranged such that said gas flow expands within said second passageway and such that substantially unexpanded particulates are substantially captured within said second opening and removed from said gas flow.

2. A cell according to claim 1 wherein said first free area is at least two times smaller than said passageway; and a distance between said outlet and said opening is between about "A" and "8A", where "A" is a quotient obtained when said first free area is divided by a perimeter of said outlet; said inlet pipe having a cylindrical settling portion of at least "A" in length, said entrapment pipe having a detaining portion of at least "2A" in length, said detaining portion being narrower in shape, as compared to said opening, so that a line tangent to a wall of said detaining portion makes an angle of at most 15° to a common axis of the casing, inlet pipe and opening.

3. A cell according to claim 1, further comprising a sliding fitting, wherein said inlet pipe is connected to said casing by said sliding fitting, so that said distance between said outlet and said opening are adjustable between "A" and "8A", where A is a quotient obtained by dividing said first free area by a perimeter of said outlet.

4. A cell according to claim 1, wherein said inlet pipe defines a first gap between an interior wall of said casing and a body of substantially cylindrical shape which is secured to said casing by legs, and wherein said entrapment pipe defines a second gap between the interior wall and an exterior wall of a vent pipe, said vent pipe being secured to said casing by legs.

5. Apparatus for separating gasses from particulates in a gas flow, comprising:
- an inlet pipe forming a first passageway for the flow, the inlet pipe having a first opening providing an exit from the first passageway, the first opening having a first free area;
- a casing mounted to the inlet pipe and forming a second passageway for the flow, the second passageway being coaxially aligned to the first passageway and having a second free area that is larger than the first free area; and
- an entrapment pipe having a second opening coaxially aligned with the first passageway, the second opening being within the casing and spaced downstream from the first passageway;
- the inlet pipe, casing, and entrapment pipe being constructed and arranged such that the flow expands within the second passageway and such that substantially unexpanded particulates are substantially captured within the second opening and removed from the flow.

6. Apparatus according to claim 5 wherein the first passageway has a settling portion defining a substantially stationary condition of the flow.

7. Apparatus according to claim 6 wherein the settling portion is cylindrical in shape.

8. Apparatus according to claim 6 wherein the settling portion is larger than about "A", where A is a half radius of the first passageway.

9. Apparatus according to claim 5 wherein the second free area is at least twice as large as the first free area.

10. Apparatus according to claim 5 wherein the entrapment pipe is mounted to the casing.

11. Apparatus according to claim 5 wherein the casing has an exit aperture arranged downstream from the second opening, providing a gas exit out of the second passageway.

12. Apparatus according to claim 5 wherein the particulates include mist droplets.

13. Apparatus according to claim 5 wherein the second opening defines a third free area that is greater than the first free area and less than the second free area.

14. Apparatus according to claim 5 wherein the entrapment pipe has a detaining portion for trapping particulates, to prevent trapped particulates from mixing with cleaned gas in the casing.

15. Apparatus according to claim 14 wherein the detaining portion forms a cylindrical shape.

16. Apparatus according to claim 14 wherein the detaining portion has a narrowed shape, relative to the second opening, and a wall which is at most fifteen degrees to an axis of the first passageway.

17. Apparatus according to claim 14 wherein the inlet pipe is substantially cylindrical shape and wherein an axial length of the detaining portion is larger than about 2A, where A is equal to one half the radius of the first opening.

18. Apparatus according to claim 5 wherein the entrapment pipe has a discharge end for discharging particulates from the apparatus, wherein a portion of gas within the gas flow carries the particulates through the entrapment pipe and to the discharge end.

19. Apparatus according to claim 5, wherein the inlet pipe is substantially round and wherein the second opening is spaced away from the first opening by a distance between about A and 8A, where A is equal to one half the radius of the first opening.

20. Apparatus according to claim 5, wherein the inlet pipe is substantially cylindrical and wherein the first passageway has a settling portion defining a substantially stationary condition of the flow, the settling portion having an axial length which is larger than about one half the radius of the first opening.

21. Apparatus according to claim 5, further comprising means for adjusting a distance between the first passageway and the second opening.

22. Apparatus according to claim 21, wherein the means for adjusting comprises a sliding fitting.

23. Apparatus according to claim 5, further comprising means for sealing the inlet pipe substantially gas tightly to the casing.

24. A high throughput gas cleaning apparatus, comprising a plurality of gas cleaning cells for removing particulates from a gas flow, each of the cells including:
- an inlet pipe forming a first passageway for a gas flow, the inlet pipe having a first opening providing an exit from the first passageway, the first opening having a first free area;
- a casing mounted to the inlet pipe and forming a second passageway for the flow, the second passageway being coaxially aligned to the first passageway and having a second free area that is larger than the first free area; and
- an entrapment pipe having a second opening coaxially aligned with the first passageway, the second opening being within the casing and spaced downstream from the first passageway;
- the inlet pipe, casing, and entrapment pipe being constructed and arranged such that the flow expands within the second passageway and such that substantially unexpanded particulates are substantially captured within the second opening and removed from the flow; and
- a conduit for connecting each of the entrapment pipes such that particulates captured within each of the second openings are collected for common discharge.

* * * * *